Figures 1, 2:
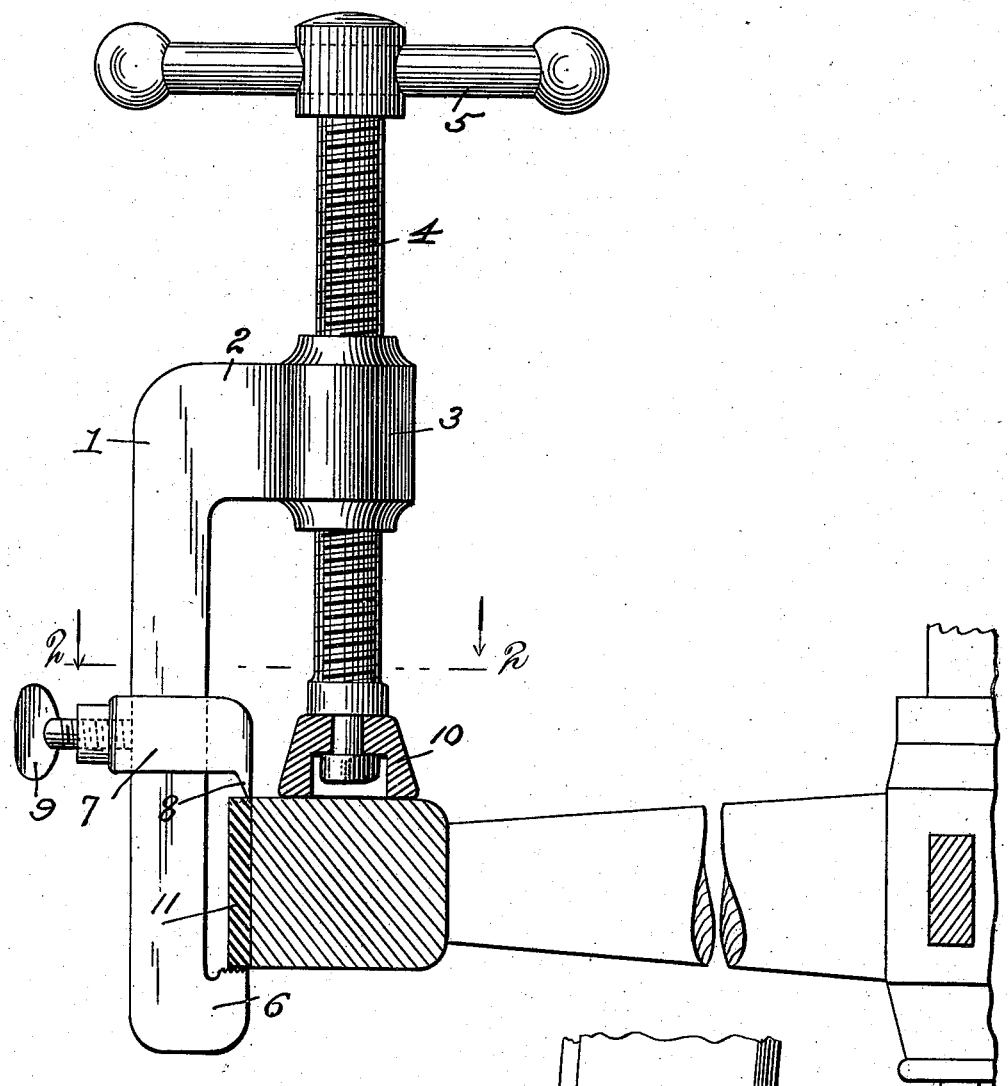

No. 858,449. PATENTED JULY 2, 1907.
R. GREEN.
DEVICE FOR REMOVING TIRES FROM WHEELS.
APPLICATION FILED MAY 18, 1906.

Witnesses
C. W. Benjamin
E. Kaufmann

Inventor
Robert Green
By his Attorneys
Davis & Davis

UNITED STATES PATENT OFFICE.

ROBERT GREEN, OF ESCONDIDO, CALIFORNIA.

DEVICE FOR REMOVING TIRES FROM WHEELS.

No. 858,449.  Specification of Letters Patent.  Patented July 2, 1907.

Application filed May 18, 1906. Serial No. 317,532.

*To all whom it may concern:*

Be it known that I, ROBERT GREEN, a citizen of the United States, residing at Escondido, in the county of San Diego, State of California, have invented certain new and useful Improvements in Devices for Removing Tires from Wheels, of which the following is a specification, reference being had therein to the accompanying drawing, in which—

Figure 1 is a side elevation of the device applied to a wheel, the wheel being in section and a part of the device being also in section to more clearly show its construction; and Fig. 2 a horizontal sectional view on the line 2—2 of Fig. 1.

One of the objects of this invention is to provide a simple device by means of which the iron tire of a wheel may be readily removed therefrom without marring the wheel or in any way distorting the felly thereof.

A further object of the invention is to provide an extremely durable and efficient device for this purpose which may be adapted to wheels of all sizes and to tires of various widths and thicknesses.

To the accomplishment of these objects and such others as may hereinafter appear, the invention consists of the parts and combination of parts hereinafter fully described, and particularly pointed out in the appended claims.

Referring to the various parts by numerals, 1 designates the frame of the device which is provided at its upper end with a horizontal arm 2, the end of this arm being formed into a head 3. This head is vertically threaded to receive the forcing screw 4. The upper end of this screw is provided with a cross-bar 5 by which it may be rotated. The lower end of the frame 1 is formed with the inward extending rigid clamp arm 6, said arm terminating close to the vertical inner side of the frame 1. Slidable vertically on the frame 1 is a clamp arm 7 which is provided at its inner end with the depending gripping point 8. By means of the set screw 9, the clamp arm 7 may be secured on the tire and frame 1 at any desired point. The clamp arm 7 is an important feature of my invention. By means of it the entire device may be secured to the tire in the proper position to permit the forcing-screw to be brought down on the felly. It also holds the tire during the operation of forcing the felly out from it and thereby prevents any distortion of the tire. As my device is a portable hand tool it is necessary to provide some means for preliminarily securing it in position on the tire before the forcing screw is brought down on the felly. If this is not done the clamping arm or jaw on the lower end of the yoke frame is very apt to be caught under the felly when the forcing-screw is brought down on the upper side of the felly with the result that the felly would be marred beyond repair. To the lower end of the forcing screw 4 is rotatably secured a bearing block 10, said block being freely rotatable on the screw, and the screw being rotated in the bearing block during the operation of removing a tire.

The operation of this device is manifest, but may be briefly described as follows: The wheel is placed in any desired position, either vertically or horizontally; as shown in the drawing it is arranged in a horizontal position. The tire removing device is placed in such a position that its clamping arm 6 is against the edge of the tire 11 of the wheel. The clamp arm 7 is then adjusted on the frame 1 to bring its point 8 against the tire and at the edges between the tire and the felly, as shown clearly in Fig. 1. The clamp is then secured in place by means of the set screw 9. It will be noted that the clamp arm 7 and the clamp arm 6 are out of line with the forcing screw 4 and the bearing block 10. The forcing screw is now rotated to bring the bearing block 10 against the wheel felly and a continuous rotation of the forcing screw will cause the tire to be slid from the felly.

It is manifest that more than one of these devices may be employed when removing a tire, said devices being placed at suitable intervals around the wheel. If desired, however, one device may be used, said device being moved from place to place around the tire in order to remove the same without canting or tilting it.

From the foregoing it will be readily seen that I provide a very simple and effective device which will be efficient, easily operated and durable.

It will be apparent to those skilled in the art that various mechanical embodiments of the inventions are possible and I, therefore, do not wish to be limited to the exact arrangement and construction shown.

Having thus described my invention, what I claim as new and desire to secure by Letters Patent, is:—

A device for removing tires from wheels comprising a yoke-shaped frame having a threaded head at its upper end and a rigid clamp arm at its lower end, said arm and head projecting in the same direction from the main bar of the yoke, the head being longer than the clamp arm and extending a considerable distance beyond the vertical plane of the rigid clamp arm, a screw working through the threaded head beyond the vertical plane of the rigid clamp arm, a movable clamp arm on the main bar of the yoke frame and adapted to be adjusted thereon, a screw carried by said movable clamp arm to secure it in its adjusted position, said movable clamp arm being in the vertical plane of the rigid clamp arm and out of the vertical plane of the forcing screw, said movable clamp arm being adapted to be brought into engagement with the upper edge of the tire to support the device in position on the tire and to prevent the distortion of the tire as the wheel is forced therefrom.

In testimony whereof I hereunto affix my signature in the presence of two witnesses this 10th day of May 1906.

ROBERT GREEN.

Witnesses:
W. N. BRADBURY,
G. B. FRISBEY.